United States Patent [19]

Le Diberder et al.

[11] 3,746,990

[45] July 17, 1973

[54] CODER-DECODER FOR USE IN A DELTA-TRANSMISSION SYSTEM

[75] Inventors: Michel Alain Rene Le Diberder, 19 Gif S/Yvette; Gilbert Marie Marcel Ferrieu, Bievres; Roger Bernard Jules Hamel, Clichy, all of France

[73] Assignee: Telecommunications Radioelectriques et Telephoniques, Paris, France

[22] Filed: Mar. 19, 1971

[21] Appl. No.: 126,151

[30] Foreign Application Priority Data

Mar. 25, 1970 France .............................. 7010766

[52] U.S. Cl. ........ 325/38 B, 332/11 D, 340/347 DD

[51] Int. Cl. ............................................ H03k 13/22

[58] Field of Search ......................... 332/11 D, 11 R; 340/347 DD; 325/38 R, 38 B

[56] References Cited

UNITED STATES PATENTS 2,662,118 12/1953 Schouten et al. ................. 332/11 D 2,990,520 6/1961 Courchene, Jr. et al...... 325/38 B X

OTHER PUBLICATIONS

IBM Technical Disclosure Bulletin, Vol. 11, No. 7, December 1968, "Push-Pull Feedback Delta Modulator" G. A. Hellwarth and G. D. Jones.

*Primary Examiner*—Benedict V. Safourek
*Attorney*—Frank R. Trifari

[57] ABSTRACT

A delta modulation transmitter includes comparator means to produce a comparison signal derived from a comparison circuit for an input analog signal and a pulse code modulator and features an AC coupled feedback from another output signal of the pulse code modulator. The AC coupled feedback signal is superimposed onto the difference signal produced by the comparator thereby to provide a reliable output signal from the pulse code modulator for a zero input analog signal and in addition, to suppress noise which would otherwise be produced in a cooperating receiver.

10 Claims, 8 Drawing Figures

INVENTORS
MICHEL A.R. LE DIBERDER
GILBERT M. M. FERRIEU
ROGER B. J. HAMEL
BY
AGENT

INVENTORS
MICHEL A. R. LE DIBERDER
GILBERT M. M. FERRIEU
ROGER B. J. HAMEL
BY
AGENT

INVENTORS
MICHEL A. R. LE DIBERDER
GILBERT M. M. FERRIEU
ROGER B. J. HAMEL
BY
AGENT

INVENTORS
MICHEL A. R. LE DIBERDER
GILBERT M. M. FERRIEU
ROGER B. J. HAMEL
BY
AGENT

PATENTED JUL 17 1973 3,746,990

INVENTORS
MICHEL A. R. LE DIBERDER
GILBERT M. M. FERRIEU
ROGER B. J. HAMEL
BY
Frank R. Trifari
AGENT

CODER-DECODER FOR USE IN A DELTA-TRANSMISSION SYSTEM

The invention relates to a delta-modulation signal transmission system and to the transmitter and receiver of the system, the transmitter comprising a comparison circuit forming a difference signal between the signal to be transmitted and a comparison signal, the difference signal being applied to a pulse-code modulator controlled by a clock pulse generator and comprising a bistable trigger circuit, whose output signals are applied to the receiver associated with the transmitter and to a local receiving circuit producing the comparison signal.

Systems of this kind are particularly employed in telephone communications for the transmission of speech signals in pulse code.

The bistable trigger circuit of the pulse code modulator provides at one of its outputs a sequence of logical signals of the values "1" or "0" in the rhythm of the clock pulses in accordance with the polarity of the difference between the signal to be transmitted and the comparison signal, that is to say in accordance with the value of the difference signal formed by the comparison circuit.

The pulse code modulator has to be designed so that the fluctuatios of the difference signal do not give rise to the transmission of several "1" or "0" signals during a period of the clock pulses in order to ensure that the logical signals are transmitted in the rhythm of the clock pulses so that they can be processed correctly in the receiver.

A known system for the above makes use of a pulse code modulator comprising a bistable trigger circuit, which when fed at its input by the difference signal, can change its state only at the instant of positive or negative transition of the clock pulses.

Bistable trigger circuits capable of changing their state during the duration of a clock pulse are usually not employed, since during the time of a clock pulse rapid fluctuations of the difference signal may give rise, for the duration of the pulse, to the transmission of an arbitrary sequence of "1" and "0" signals. However, the use of bistable trigger circuits changing their states at the transitions involves serious disadvantages in the absence of speech signals to be transmitted in the time intervals between the words of a telephone conversation. In the absence of signals to be transmitted, the transmitter has to furnish in the rhythm of the clock pulses a sequence of regularly alternating "1" and "0" signals in order to supply to the acoustic transducer of the receiver a current of the mean value zero.

When the transmitter does not provide such a sequence, unacceptable noise is produced at the receiver end.

When using a bistable trigger circuit changing its state at the instants of transition, it is very difficult to control the transmitter in the quiescent periods such that a sequence of regularly alternating "1" and "0" signals is transmitted and particularly to ensure that this adjustment is maintained in the course of time.

The speech signal of the theoretical value zero and the locally produced comparison signal may be subject to fluctuations and excursions such that the instant at which the difference between these signals changes its polarity may occur prior to or after the exact instant of a transition at which the bistable trigger circuit is adapted to change its state. Contrary to what is desired, no sequence of regularly alternating "1" and "0" signals is obtained at the output of the trigger.

The invention reduces these disadvantages and provides a delta-modulation transmission system in which in the absence of speech signals the transmitter furnishes a sequence of regularly alternating "1" and "0" signals, while the fluctuations and excursions have less influence than in the known systems, while in addition the logical signals supplied by the transmitter can change their values only once during a clock pulse period, which means that these logical signals are transmitted in the rhythm of the clock pulses.

According to the invention the transmitter of a delta-modulation transmission system is characterized in that the pulse code modulator comprises a bistable trigger circuit of the type capable of changing its state at any time during the clock pulses under the control of the difference signal and in that a positive feedback circuit is connected between an output of the bistable circuit and an appropriate point of the comparison circuit so that a feedback voltage pulse is superimposed on the difference signal between the instant of change of state of the bistable circuit and the end of the clock pulse.

The invention provides a simple and advantageous embodiment for such a trigger and for the compression circuit and the amplitude modulator by means of which the comparison signal is produced.

These circuits can be employed in the receiver associated with the transmitter.

The following description given by way of non-limiting example with reference to the accompanying drawings will show how the invention may be carried into effect.

FIG. 1 shows a block diagram of a transmitter for use in a delta-modulation transmittion system embodying the invention.

Figure 1:
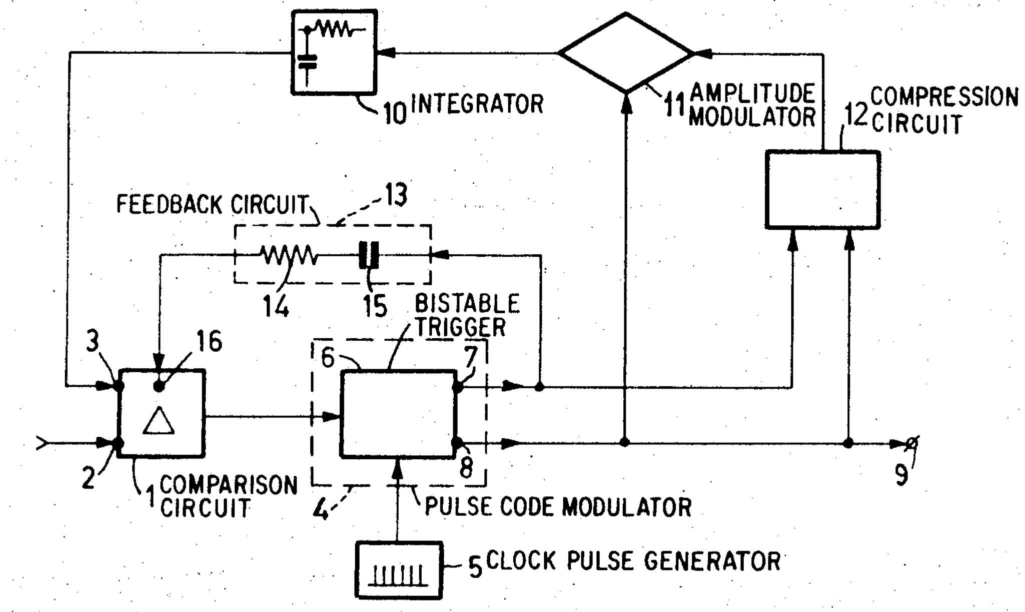
FIG. 1 is a simplified block diagram of a delta-modulation transmitter embodying the invention.

This transmitter comprises a comparison circuit 1 forming a difference signal between the signal to be transmitted applied at 2 and the comparison signal applied at 3. The resultant difference signal is applied to a pulse code modulator 4, controlled by a clock pulse generator 5 and comprising a bistable trigger 6. The bistable trigger 6 provides at one of its complementary outputs 7 and 8 a sequence of "1" or "0" logical signals in accordance with the polarity of the difference between the signal to be transmitted and the comparison signal, that is to say in accordance with the value of the difference signal formed by the comparison circuit 1. The signals occurring at the terminal 8 of the bistable circuit 6 are fed to the output 9 of the transmitter for transmission to the receiver associated with the transmitter. The output signals of bistable circuit 6 are also applied to a local receiving circuit intended to produce the comparison signal applied to the input terminal 3 of the comparison circuit 1. This local receiving circuit comprises an amplitude modulator 11, which controls the charge or the discharge of an integrator 10 in accordance with the values of the logical signal occurring at the output 8 of bistable circuit 6. This local receiving circuit comprises, in addition, preferably a compression circuit 12, which controls, by means of modulator 11, the intensity of the charging and discharging current of the integrator 10 in accordance with the number of "1" or "0" signals at 8 by trigger 6 occurring at terminal 8 of bistable circuit 6, exceeding a predetermined number below which the charge and the discharge of the integrator 10 is always performed with the same current.

As stated above, it is necessary for the bistable trigger 6 to change its state only once during a clock pulse period supplied by the generator 5 so that the logical signals can be transmitted in the rhythm of the clock pulses.

In order to avoid that rapid fluctuations of the difference signal produce several changes of the state of the bistable circuit during a clock period the known systems employ, as stated above, a trigger 6, which can change its state under the control of the difference signal only at the instant of transition of the clock pulses.

Figure 2:
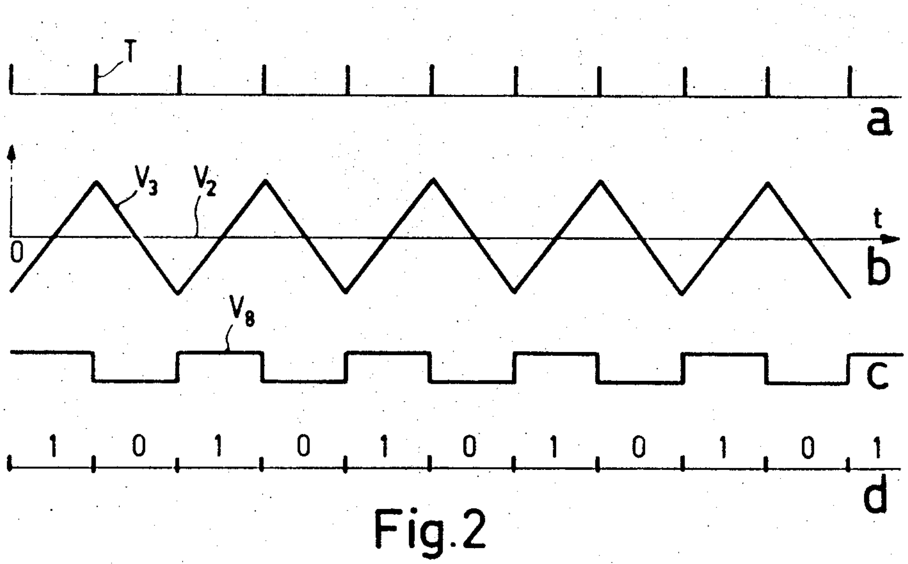
FIGS. 2 and 3 illustrate the applied signals and the transmitted signals of a known transmitter.
Figure 3:
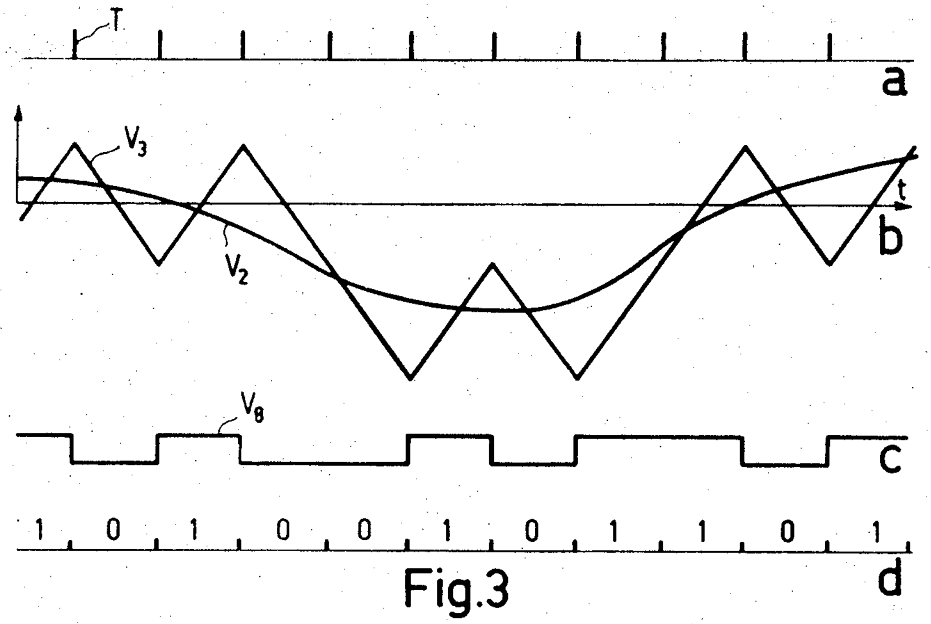

With reference to FIGS. 2 and 3, it will be shown to what drawback this design gives rise when the transmission system is in the quiescent state, that is to say, when the signal to be transmitted applied to the input terminal 2 of the comparator is zero. It is known that in this case the signals transmitted to the receiver have to form a sequence of regularly alternating "1" and "0" signals.

FIG. 2 illustrates various signals of a delta-modulation transmitter comprising a bistable circuit which is triggered to change state by transitions, said transmitter furnishing in the quiescent state, when correctly adjusted, a sequence of regularly alternating "1" and "0" signals.

The diagram **2*a*** only shows the transition T of the clock signal which may trigger the bistable circuit to change state.

The diagram **2*b* illustrates the signals V2 and V3 applied to the terminals 2 and 3 respectively of the comparator 1. In the case under consideration, the signal to be transmitted is zero and the curve representing V2** coincides with the time axis.

The signal V3 is the comparison signal supplied by the integrator 10, which is charged or discharged in accordance with the value of the signal V8 derived from the output 8 of the bistable circuit 6, and shown in FIG. **2*c***.

In the case illustrated in FIG. 2 the bistable circuit 6 can change state under the control of the difference signal V3–V2 only at the instant of transition T. The curve V3 is obtained as follows:

At the instants of transition T, if V3–V2 $> 0$, the signal V8 at the output of the bistable circuit has the value 0, the integrator is discharged and the slope of V3 becomes negative:; if V3–V2 $< 0$, the signal V8 assumes the value "1", the integrator is charged and the slope of V3 becomes positive.

Under these conditions it will be apparent that the comparison voltage V3 is a perfectly regular sawtooth. The change of the slope of V3 occurs at each transition T. The amplitude of the variation of V3 between two consecutive transitions is constant. The signals V8 form a sequence of regularly alternating "1" and "0" pulses. The diagram **2*d*** illustrates this sequence.

FIG. 3 illustrates the same signals as FIG. 2, but for the case in which the comparison signal and the signal to be transmitted (theoretically of zero value) exhibit excursions from zero in an undesirable manner.

The diagram **3*a* illustrates the same transitions T as the diagram 2*a***.

The excursions from zero of the comparison signal and of the signal to be transmitted may in general be represented by a voltage applied to the terminal 2 of the comparator. In this case, when the transmitter is in the quiescent position, that is to say, when the signal to be transmitted is zero, a voltage V2 $= u$ is obtained instead of a signal V2 $= 0$ as in the diagram of FIG. **2*b*. The diagram 3*b* illustrates by way of example a randomly variable voltage V2**, representing the excursions from zero of the voltages applied to the input of the comparator.

By the same method as described with reference to FIG. 2, the comparison signal V3 is indicated at **3*b* and the signal V8 at the output of the bistable circuit 6 is given at 3*c***.

It will be apparent from the example illustrated in FIG. 3 that at each transition T of the clock signal there will neither occur a change of the slope of the comparison signal V3, nor a change of the signal V8 at the output of the bistable circuit. Consequently, as is shown in the diagram **3*d***, the output of the transmitter does not supply a sequence of regularly alternating "1" and "0" signals.

The defective operation illustrated in FIG. 3 may also be due to positive and negative slope variations of the signal V3, to stray voltages superimposed on V2 or V3, etc.

The invention has for its object to reduce the sensitivity of the transmission system in the quiescent position to the fluctuations and excursions.

According to the invention the pulse code modulator 4 of a delta-modulation transmitter of FIG. 1 comprises a bistable trigger circuit 6 of the type capable of changing state at any time during the clock pulses under the control of the difference signal, and a positive feedback circuit 13 including, for example, a resistor 14 in series with a capacitor 15, connected between the output 7 of the bistable circuit 6 and a suitable point 16 of the comparator 1 so that a feedback voltage pulse is superimposed on the difference signal formed by the comparator 1 between the instant of change of state of the bistable circuit 6 and the end of the clock pulse.

Figure 4:
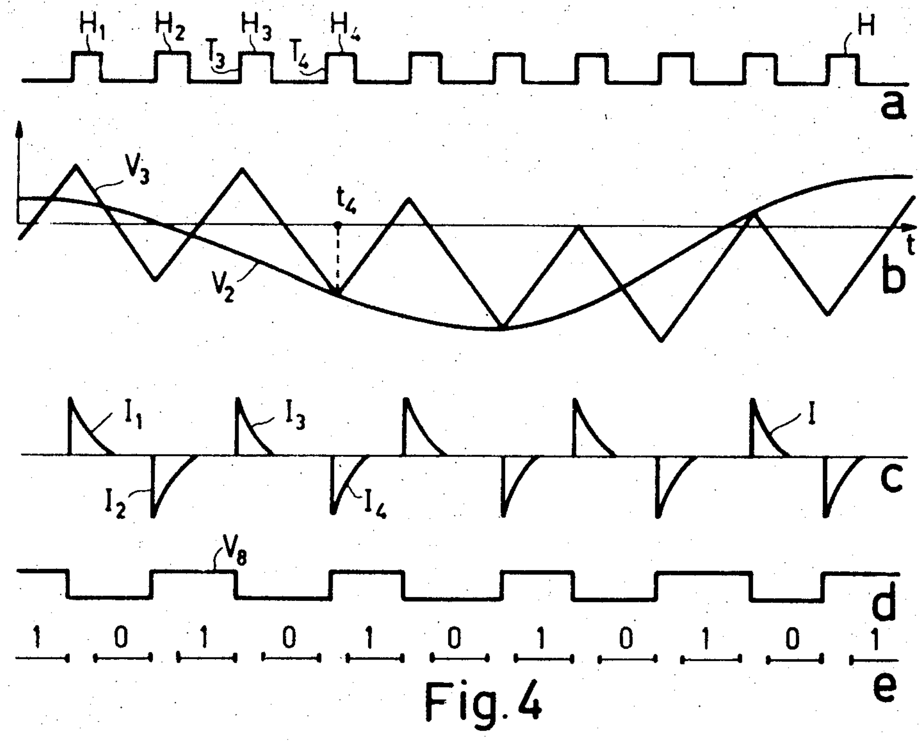
FIG. 4 illustrates the applied signals and the transmitted signals of a transmitter embodying the invention.

The operation of the delta-modulation transmitter embodying the invention will now be described with reference to FIG. 4.

The diagram **4*a* illustrates clock pulses H, the duration $\tau$ of which is an appreciable fraction of the clock pulse period. According to the invention the bistable circuit 6 can change state at any instant during the time $\tau$ of the clock pulses in accordance with the polarity of the difference between the signals V3 and V2 applied to the inputs 3 and 2 respectively of the capacitor 1**.

The diagram **4*b*, like FIG. 3*b***, illustrates the excursions from zero of the comparison signal and of the signal to be transmitted (which is theoretically zero).

In order to trace the comparison signal V3, not only the polarity of V3–V2 for the duration $\tau$ of the clock pulses, but also the pulses of the feedback voltage produced by the positive feedback circuit at the instant of change of state of the bistable circuit and superimposed on the difference signal V3–V2 have to be taken into account. These pulses I are illustrated in the diagram 4*c*, whereas 4*d* illustrates the output signal V8 of the trigger.

At the appearance of the clock pulse H1 the difference (V3–V2) is positive, which means that the output signal V8 of the trigger changes state from "1" to "0" and the slope of V3 becomes negative. At the same time a voltage pulse $I_1$ is produced by the feedback circuit, which pulse is superimposed on the difference signal V3–V2 with the same polarity as V3–V2 at the instant of change-over of the bistable circuit. The amplitude and the duration of $I_1$ have to be sufficient to prevent any further change of state of the bistable circuit for the duration of H1 regardless of a change of polarity of V3–V2.

At the appearance of the clock pulse H2, V3–V2 is negative, V8 changes from "0" to "1", the slope of V3 becomes positive. At the same time a negative-going feedback pulse is superimposed on the also negative difference voltage V3–V2 so that for the whole duration of H2 the change of state of the trigger is maintained.

A similar process takes place with the clock pulse H3.

With the clock pulse H4 the advantage of the invention will be apparent. It will be seen that at the instant of the transition T4 of this pulse H4 the difference signal V3–V2 has the same (positive) polarity as at the instant of the transition T3 of the clock pulse H3. If a bistable circuit changing state at the transitions is employed, no change of state would occur at the instant of T4, which thus would give rise to the transmission of two consecutive "0".

In contrast herewith, the invention permits of obtaining a change of state of the bistable circuit at any time during the pulse H4. At the instant T4 of the change 4*b* the difference V3–V2, which is first positive, attains zero and tends to become negative. With a slightly negative difference signal (not shown) the output signal V8 of the bistable circuit tends to change over from "0" to "1." Owing to the negative pulse I4 produced by the feedback circuit the change of state of the bistable circuit is immediately confirmed and maintained up to the end of the pulse H4.

The comparison signal V3 and the signal V8 at the output of the bistable circuit can be traced in the same manner for the successive clock pulses. The diagram 4*d*, in contrast to FIG. 3*c*, shows that a change of state is obtained at each clock pulse H inspite of the excursion voltage V2. The diagram 4*e* shows the sequence of regularly alternating "1" and "0" signals, which is obtained in the time interval between the clock pulses.

According to the invention the use of a bistable circuit changing capable of changing state at any time during the clock pulses permits of varying the delta step, which is a function of the ratio between the duration of the clock pulses and their period. This ratio may have a maximum value of 0.5. This results in a diminution of the sensitivity of the transmission system to excursions of the voltages applied to the comparator. This advantage is obtained by the use of the positive feedback circuit, which prevents the transmitted signal from changing state more than once during a clock pulse period.

This possible variation of the delta step is also advantageous during the non-quiescent periods of the transmitter. It also permits the comparator to follow the signal to be transmitted more rapidly and hence more precisely. The delta step variation enabled by the invention is independent of that provided by the compression circuit, but it may be superimposed thereon.

Figure 5:
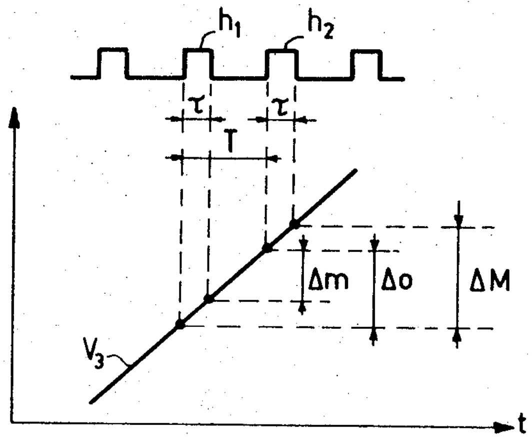
FIG. 5 illustrates the possible variation of the delta voltage step in a transmitter embodying the invention.

FIG. 5 shows the variation of the delta step, which can be obtained. Two consecutive clock pulses h1 and h2 and the comparison signal V3 are shown. With a given flank of the signal V3, when a bistable circuit changing state at the transitions is used, the delta step voltage has the fixed value Δ, obtained by the difference between the values of V3 at the instants of consecutive transitions of the same polarity of the clock pulses. In contrast herewith, the invention permits a variation of the delta step voltage from the minimum value Δ *m* to the maximum value Δ M. If T is the period of the clock pulses, i.e., their duration, the relative variation $\Delta M - \Delta m/\Delta$ is equal to $2\ \Delta/T$.

Figure 6:
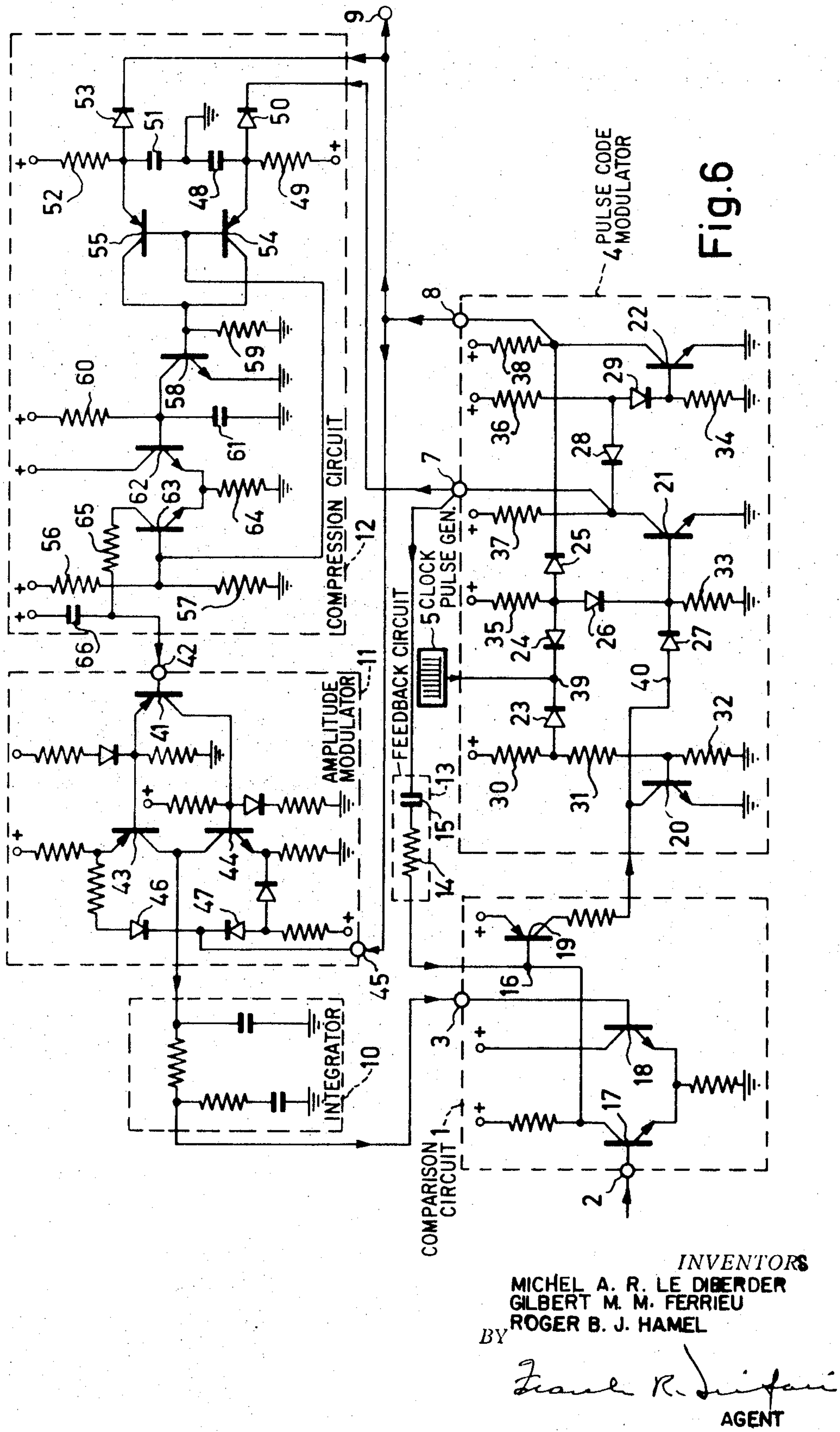
FIG. 6 shows a diagram of an embodiment of a transmitter in accordance with the invention.

FIG. 6 shows an embodiment of a delta-modulation transmitter, in accordance with the invention.

FIG. 6 shows the comparator 1 having an input 2 for the signal to be transmitted and an input 3 for the comparison signal. It shows furthermore the pulse code modulator 4, connected to the clock pulse generator 5 and comprising two complementary outputs 7, 8 for logical signals. The logical signals at the output 8 are applied to the output terminal 9 for being transmitted to the receiver. The comparison signal is supplied by the integrator 10, which is charged or discharged by means of the modulator 11 and the compression circuit 12. The positive feedback circuit 13, formed by the resistor 14 in series with the capacitor 15, is connected between the output 7 of the pulse code modulator and a suitable point 16 of the comparator 1.

The pulse code modulator circuit 4 shown in FIG. 6 performs the function of the bistable circuit according to the invention in a particularly simple and advantageous manner.

This circuit, as all other circuits of the transmitter, is fed from a positive voltage source +E, the negative terminal of which is earthed.

The circuit 4 is controlled by the difference signal, which is formed in the following manner in the comparator 1. This comparator 1 comprises two NPN-type transistors 17 and 18, connected as comparators so that the voltage at the collector of transistor 17, connected to the terminal 16, is a function of the difference V3–V2 between the comparison signal V3 and the signal to be transmitted V2. The PNP-transistor 19 is connected by its base to the terminal 16.

If V3–V2 > 0, the transistor 18 is more conducting than the transistor 17 and with a sufficient difference V3–V2 transistor 18 is saturated and transistor 17 is cut off. At the same time the current of transistor 19 drops to an extent such that the transistor is cut off. If V3–V2 < 0, the inverse effect is obtained so that the current of transistor 19 rises to the saturation value.

The current of transistor 19 controls the pulse code modulator 4.

The pulse code modulator 4 comprises the NPN-transistors 20, 21 and 22, and a network of diodes 23, 24, 25, 26, 27, 28 and 29. The base of transistor 20 can be biassed with the aid of the resistance bridge 30, 31, 32. The base of transistor 21 can be biassed by the series connection of resistor 35, diode 26 and resistor 33.

The base of transistor 22 can be biassed by the series connection of resistor 36, diode 29 and resistor 34. The resistors 37 and 38 are load resistors connected to the collectors of transistors 21 and 22. The diode 28 provides a coupling between the collector of transistor 21 and the base of transistor 22. In the same manner diode 25 provides a coupling between the collector of transistor 22 and the base of transistor 21. The output of the clock pulse generator 5 is connected to the junction 39 of diodes 23 and 24.

In accordance with the clock pulse at point 39 the pulse code modulator 4 operates in two different modes.

In a first operational phase, in which the clock pulse is produced, the junction 39 is at zero potential and the two diodes 23 and 24 are conducting. Through diode 23 the base of transistor 20 is practically connected to mass and this transistor is cut off. It behaves like an open switch and the current of transistor 19, representing the output signal of the comparator, is transmitted through lead 40 to the base of transistor 21. During this first phase of operation the junction of the anodes of the diodes 25 and 26 is at zero potential via diode 24 and the diodes 25 and 26 are cut off. Under these conditions the transistor 21 is controlled during the whole first phase by the current of transistor 19 arriving at its base via lead 40 and diode 27. The transistor 27 is controlled at its base by the collector voltage of transistor 21 via diode 28. It will first be assumed that in this first place of operation the voltage V3–V2 increases from a negative value to a positive value. With a highly negative value transistor 19 is saturated, transistor 21 is saturated and transistor 22 is cut off. The two outputs 7 and 8 of the modulator have two complementary logical signals (for instance "0" at output 7 and "1" at output 8).

Between a slightly negative value of the voltage V3–V2 and a slightly positive value transistor 19 is in its linear operation zone and is current drops from the saturation value to zero. Under the control of this current the cascade connection of the transistors 21 and 22 behaves like a linear amplifier. With a value V3–V2 very near zero the current of transistor 21 rapidly drops to zero and the current of transistor 22 rapidly rises to its saturation value. When V3–V2 has exceeded a slightly positive value, logical signals are obtained at the outputs 7 and 8, which are the inverse of the signals obtained when V3–V2 is negative. A signal "1" is obtained at output 7 and a signal "0" at output 8.

As a matter of course, the inverse effect is true with a voltage V3–V2 decreasing from a positive value to a negative value.

The function of the positive feedback circuit 13 formed by the resistor 14 and the capacitor 15 is to accelerate the change-over of the transistors 21 and 22, particularly, to prevent fluctuations of V3–V2 around zero from producing several changes-over of these transistors 21 and 22. The operation of this feedback circuit is as follows:

When a voltage V3–V2 increasing from a negative value to a positive value through zero gives rise to a reduction of the current of transistor 19, transistor 21 changes over from the saturated state to the cut-off state, as stated above. Consequently, the voltage at the output terminal 7 changes zero to the value +E. Consequently, the feedback RC-circuit provides at 16 to the base of transistor 19 a positive voltage pulse which tends to reduce the current of transistor 19 and hence to confirm the state of transistors 21 and 22.

It will be apparent that a decreasing voltage V3–V2 would produce a negative voltage pulse, which would also confirm the change-over of the transistors 21 and 22.

The RC-circuit is chosen so that the duration of the feedback pulse is at least equal to the duration of the clock pulses and at the most equal to the time interval between two clock pulses. The amplitude of the pulse is such that a single change-over of the transistors 21 and 22 is possible during the application of the clock pulses.

In the second phase of operation of the pulse code modulator 4, that is to say, in the absence of clock pulses, the junction 39 is at a positive potential, diodes 23 and 24 are cut off and transistor 20 is biassed at its base by the resistance bridge 30, 31, 32 so that it is saturated. The transistor behaves substantially as a closed switch deriving the complete current of the transistor 19. The head 40 is at zero potential and diode 27 is cut off. Consequently, during this second phase the state of transistors 21 and 22 is independent of the output signal of the comparator, that is to say of V3–V2 and of the feedback voltage, which may still subsist. These transistors remain in the state occupied at the end of the first phase, that is to say at the end of the clock pulse. If transistor 21 were conducting and transistor 22 cut off, the state of transistor 21 is held conducting by the positive voltage at its base via the circuit including the series connection of resistors 35, diode 26 and resistor 33, as soon as the clock pulse has disappeared, whereas transistor 22 is held in the cut-off state since, with a conducting transistor 21, diode 28 becomes conducting so that diode 29 is cut off, the base of transistor 22 being thus connected to earth. Likewise, if transistor 22 were conducting and transistor 21 cut off, the state of transistor 22 is held conducting by the positive voltage applied to its base by the circuit including the series connection of resistor 36, diode 29 and resistor 34, as soon as the clock pulse has disappeared, whereas transistor 21 is held in the cut-off state, since with a conducting transistor 22 the diode 25 becomes conducting so that diode 26 is cut off and the base of transistor 21 is connected to earth.

Consequently the pulse code modulator circuit 4 of FIG. 6 operates, in accordance with the invention, like a bistable circuit changing its state within the duration of the clock pulses, said bistable circuit being capable of changing state only once within the duration of the clock pulses owing to the feedback circuit. This circuit is very simple and its operation is quite reliable.

FIG. 6 also shows a simple embodiment of the local receiver circuit, which serves to produce the comparison signal by means of logical output signals of the pulse code modulator 4.

This circuit comprises the amplitude modulator 11, which controls the charge or the discharge of the integrator 10 in accordance with the logical signals provided by the output 8 of the circuit 4. The intensity of the charging and discharging currents of the integrator 10 is varied in accordance with the value of the signal furnished by the compression circuit 12, which is controlled by the two complementary outputs 7 and 8 of circuit 4. This compression circuit supplies to the modulator 11 an analogous signal of variable amplitude, depending upon the number of consecutive "0" and "1"

signals transmitted, when said number exceeds a given threshold fixing the threshold of operation of the compression. Below this threshold the modulator 11 supplies to the integrator charging or discharging currents of constant intensity.

The amplitude modulator 11 comprises the PNP-transistor 41, the base of which, connected to the input 42, is controlled by the compression signal and the emitter and collector currents of which permit of controlling the base current of the two complementary push-pull-connected transistors 43 and 44. These two transistors operate each as a current generator, one for charging and the other for discharging the integrator. When the arrangement is stable for the same compression signal, the charging and discharging currents of the integrator have the same intensity.

When the input 45, connected to the output 8 of the circuit 4, is at positive potential (logical signal "1"), the two diodes 46 and 47 are cut off, transistor 43 is conducting and its collector current charges the integrator 10, whereas transistor 44 is cut off. When input 45 is earthed (logical signal "0"), the two diodes 46 and 47 are conducting so that transistor 43 is cut off and transistor 44 is rendered conducting, the collector current of the latter discharging the integrator 10. This type of amplitude modulator, in which the two transistors 43 and 44 operate each as current generators, permits of obtaining a linear charge of the integrator and hence a linear variation of the delta step voltage.

At its input the compression circuit 12 has two identical RC-circuits connected respectively to the complementary outputs 7 and 8 of the modulator circuit 4 via diodes. To the output 7 are connected the capacitor 48, the resistor 49 and the diode 50. To the output 8 are connected the capacitor 51, the resistor 52 and the iode 53. When the output 7 is at positive potential (.e.g., logical signal "1"), and the output 8 is earthed (logical signal "0"), the capacitor 48 is charged through the resistor 49, whereas the capacitor 51 remains discharged. Conversely, when the output 7 is earthed and the output 8 is at a positive potential, the capacitor 51 is charged through resistor 52, whereas capacitor 48 remains permanently discharged.

Figure 7:
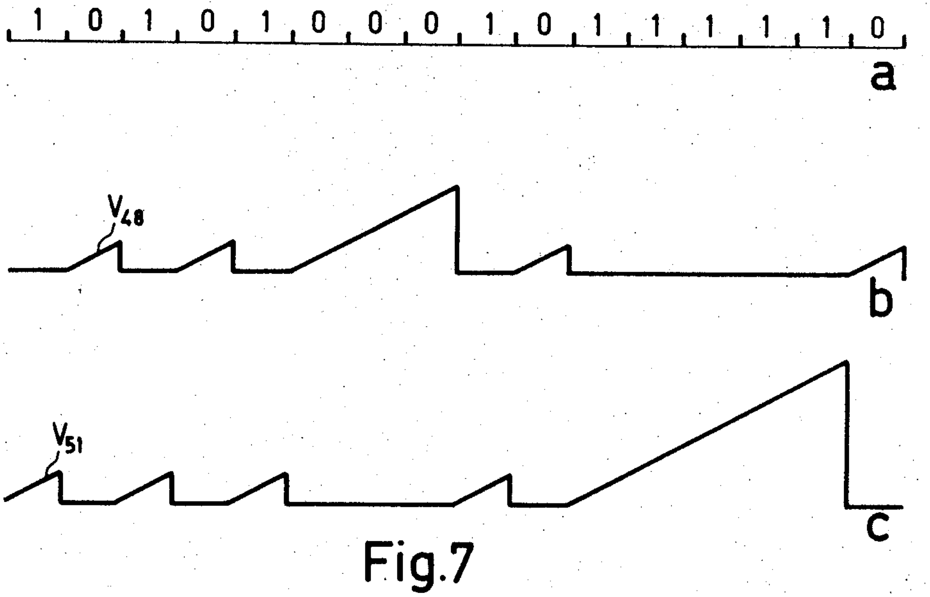
FIG. 7 illustrates signals of the compression circuit.

In the linear zone of the charge of the capacitors and as far as the duration of the "1" and "0" signals is always the same, it will be apparent that the positive voltage at case of the capacitors 48 and 51 is proportional to the number of "0" or "1" signals supplied by the transmitter. FIGS. 7 and **7*a* illustrate an arbitrary sequence of "0" and "1" signals transmitted to the receiver, from the output 8 of the circuit 4. The diagram 7*b* illustrates the voltage V48, which occurs at the terminals of capacitor 48 and the diagram 7*c* illustrates the voltage V51 appearing at the capacitor 51. FIG. 7 shows the cae in which the duration of the logical signals is equal to the period T of the clock pulses. As stated above, with the pulse code modulator 4 according to the invention the duration of the logical signals obtained is not always strictly the same, since it may vary between $T-\tau$ and $T+\tau$, wherein $\tau$ is the duration of the clock pulses. This is not a source of trouble, but on the contrary it is advantageous to the formation of the compression signal, which can be adjusted more precisely in accordance with the real duration of the "1" and "0" signals supplied by the pulse code modulator 4.**

The capacitors 48 and 51 are respectively connected to the emitters of the two PNP-transistors 54 and 55, the bases of which are connected to each other and brought to a reference voltage *v*, by means of the bridge formed by the two resistors 56 and 57. The collectors of the transistors 54 and 55 are connected in common to the base of the NPN-transistor 58, said base being earthed through a resistor 59. The collector of the transistor 58 is connected to the central point of the RC-circuit formed by a resistor 60 and a capacitor 61, the other end of the resistor being connected to the positive terminal of the supply source and the other end of the capacitor being earthed. This central point is connected on the other hand to the base of the NPN-transistor 62, which forms together with the NPN-transistor 63 and the common emitter resistances 64, a comparison circuit. The base of the transistor 63 is biassed by the reference voltage, mentioned above and to its collector are connected in series a resistor 65 and a capacitor 66, connected to the positive terminal of the supply source.

The compression circuit operates as follows: When the voltage at capacitor 48 or at capacitor 51 attains a threshold value determined by the reference voltage V, one or the other of the two transistors 54 or 55 becomes conducting, which results in both cases that the transistor 58 also becomes conducting. By means of the reference voltage V, the number of "0" or "1" consecutive signals transmitted can be determined, at which a compression signal is formed to modify the delta step. The number at which the delts step is modified, may be 4. It should be noted that one of the transistors 54 or 55 is conducting, the other is cut off by the base emitter voltage V.

As soon as the voltage at capacitor 48 or 51 has slightly exceeded the aforesaid threshold value V, transistor 58 is saturated so that capacitor 61, previously charged by the positive supply voltage +E, is rapidly discharged. The comparison circuit formed by the transistors 62 and 63, arranged so that transistor 63 is cut off and transistor 62 is saturated, changed over to the inverse state so that transistor 63 is saturated and transistor 62 is cut off.

When the voltage at capacitor 48 or 51 returns to zero, and hence drops below the threshold V, the two transistors 54 and 55 are cut off and transistor 58 is immediately cut off. On the contrary the comparator formed by the transistors 62 and 63 does not immediately change over to its initial state owing to the time constant of the charge of capacitor 61 through resistor 60. The comparator will change over only when the voltage at the base of transistor 62 exceeds the voltage V of the base of transistor 63. This constant time lag, fixed by the time constant of the RC-circuit formed by capacitor 61 and resistor 60 is equal to the duration of the sequence of "1" or "0" signals determining the operational threshold of the compression (duration of 4 "1" or 4 "0" signals in said example). In this manner, if $N$ is the number of consecutive "1" or "0" signals fixing the operational threshold of the compression and if $N+N$ is the number of consecutive, transmitted "1" or "0" signals, the compression control-pulse applied by the transistor 63 will have a duration corresponding to $N+N$. Owing to these measures, no compression control-signal is formed below the threshold fixed by the reference voltage *v*. Above said threshold the compression control-signal is formed as if the threshold did not exist.

The compression control-pulses obtained at the collector of transistor 63 are integrated by means of the buffer capacitor 66, so that an analogue signal can be obtained for controlling the amplitude modulator 11.

Figure 8:
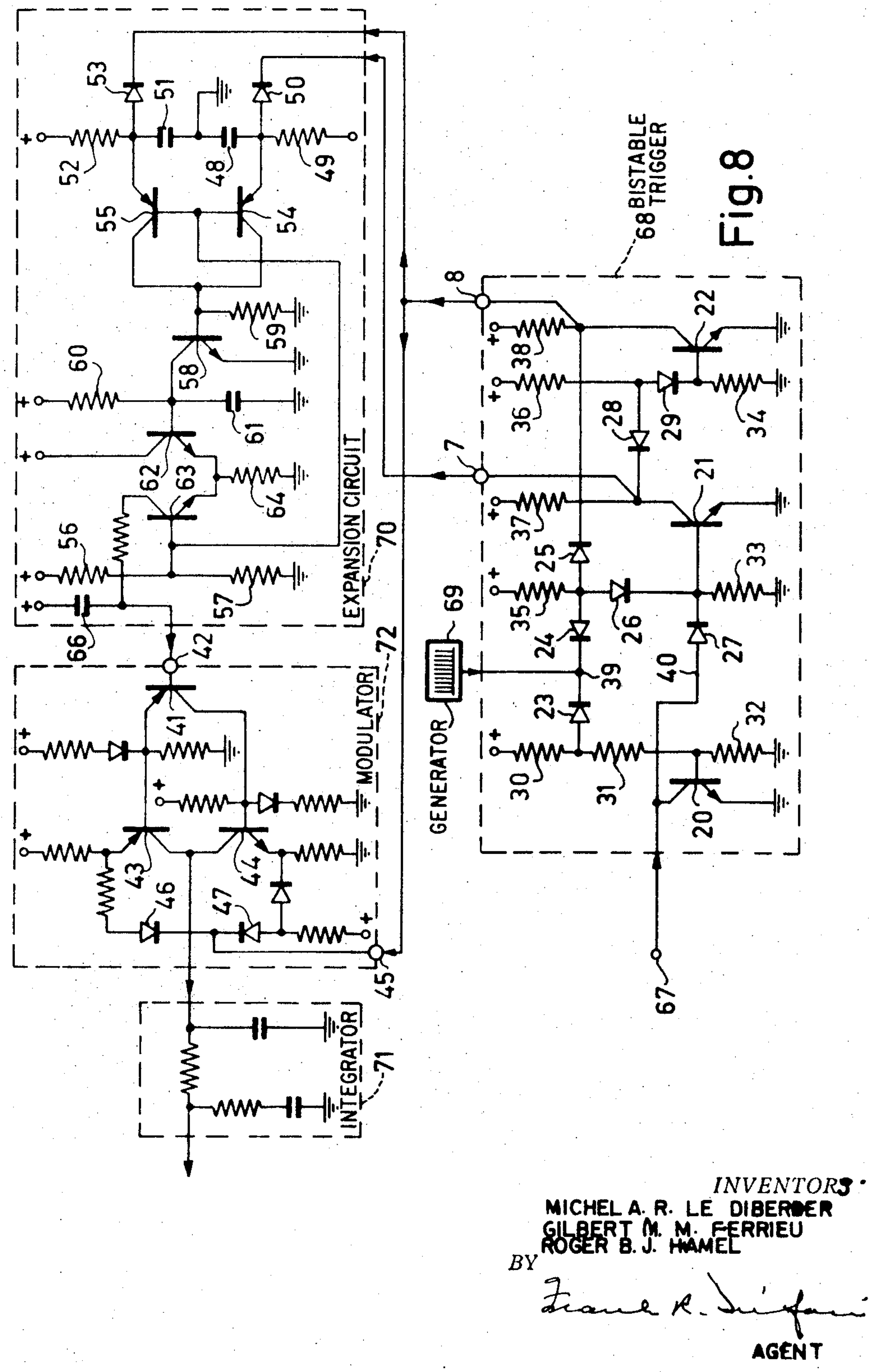
FIG. 8 shows a diagram of an embodiment of a receiver in accordance with the invention.

FIG. 8 shows the circuit diagram of a receiver for use in a delta-modulation transmission system, in which many of the circuits of the transmitter of FIG. 6 are employed.

The logic signals received at 67 are applied to the input of a circuit 68, which operates as a bistable trigger identical to the pulse code modulator of the transmitter, which circuit is connected to a clock pulse generator 69, synchronized with that of the transmitter. The receiver does not comprise a positive feedback circuit like the transmitter, since logical signals are directly applied to its input and it does not comprise a comparator like the transmitter, to the inputs of which are applied analogue signals likely to exhibit deviations.

The signals at the complementary outputs of the circuit 68 are applied to the expansion circuit 70, identical to the compression circuit of the transmitter. This expansion circuit 70 controls, like the compression circuit of the transmitter, the intensity of the charging or discharging currents of the integrator 71 by means of the amplitude modulator 72. At the output of the integrator 71 appears the restored analogous signal, which has been applied to the transmitter.

In the various circuits of the receiver of FIG. 8 the elements employed are designated by the same reference numerals as in the transmitter of FIG. 6.

What is claimed is:

1. A transmitter for use in a delta modulation system, comprising clock pulse generator means, a pulse code modulator controlled by the generator and comprising a bistable trigger circuit of the type capable of changing its conduction state under the control of an input signal at any time during the duration of a clock pulse applied thereto, signal comparison means, means for coupling an analog signal as a first input to said comparison means, means coupling said comparison means to said pulse code modulator, means for deriving a first output signal from said modulator, means for integrating said first signal and for applying the same to said comparison means, means for deriving a second output signal from said modulator, means for differentiating said second output signal from said modulator and means for applying said differentiated second output signal to said comparison means as a positive feedback voltage pulse whereby the differentiated second output signal is superimposed on the difference signal supplied by said comparison means to said modulator.

2. A transmitter as claimed in claim 1, wherein said means for applying said second output signal comprises a resistor and a capacitor in series connection.

3. A transmitter as claimed in claim 1, wherein said means for applying said second output signal comprises a feedback loop, and wherein the differentiating means comprises means for providing a feedback pulse having a duration exceeding the clock pulse duration.

4. A transmitter as claimed in claim 1, wherein the ratio of the duration of the clock pulse to the period between clock pulses is less than 0.5.

5. A transmitter as claimed in claim 1, wherein the bistable circuit comprises an input transistor, said input transistor operating as a switch under the control of the clock pulse and directing the difference signal to ground during the absence of a clock pulse and directing the difference signal to two cascade connected transistors during the clock pulse, said cascade connected transistors producing complementary output pulses, means comprising a diode and a resistor coupled to said two cascade connected transistors for permitting the cascade transistors to operate as an amplifier for the difference signal in response to the presence of a clock pulse and for maintaining the transistors in the state occupied at the end of the period of the first of the two clock pulses in response to the absence of a clock pulse.

6. A transmitter as claimed in claim 1, wherein the means for deriving a first output signal from said modulator comprises an amplitude modulator, said amplitude modulator comprising two complementary transistors operating each as a current generator for charging and discharging the integrator.

7. A transmitter as claimed in claim 6, further comprising a compression circuit for controlling the amplitude modulator, said compression circuit comprising two input means each of which includes a diode and a resistance-acapacitance circuit, means to couple an output signal of the pulse code modulator as one input signal to the compression circuit, means to couple a complementary output signal of said pulse code modulator as a second input signal to the compression circuit, said compression circuit comprising a comparison circuit for supplying compression controlled pulses when the voltage at one of the capacitors in the two RC circuits exceeds a given threshold.

8. A receiver for use in a delta modulation transmission system comprising a clock pulse generator; a bistable trigger controlled by the generator; an expansion circuit coupled to the output of the bistable trigger; an amplitude modulator having an output current corresponding to an input signal; means to couple an output of the expansion circuit as an input signal to the amplitude modulator; and an integrator coupled to the output of the amplitude modulator; said bistable circuit comprising an input transistor and two cross coupled transistors connected to the input transistor, said input transistor operating as a switch under the control of the clock pulses and directing the received signals to ground potential during the absence of clock pulses and directing the received signals to the two cascade connected transistors during the interval of the clock pulse, and a network of diodes and resistors comprising the cross coupling of the cross coupled transistors so that the two transistors operate as an amplifier during a clock pulse and so that during the time between two consecutive clock pulses the two transistors remain in the state occupied at the end of the first of the two clock pulses.

9. A receiver as claimed in claim 8, wherein the amplitude modulator comprises complementary transistors operating each as a current generator for charging and discharging the integrator.

10. A receiver as claimed in claim 8, wherein the expansion circuit comprises two input circuits, each input circuit of the expansion circuit comprising a diode coupled to a RC circuit, the expansion circuit being coupled to the bistable circuit so that the bistable circuit provides a separate input signal to each of the input circuits of the expansion circuit, said expansion circuit further comprising a comparison circuit for supplying controlled pulses for the amplitude modulator when the voltage at one of the capacitors exceeds a given threshold.

* * * * *